United States Patent
Dastidar

[11] Patent Number: 5,565,723
[45] Date of Patent: Oct. 15, 1996

[54] MECHANICAL POWER TRANSMISSION ASSEMBLY

[76] Inventor: Pranab Dastidar, F 3, Raj Kunj Co. Op. Hsq Society Ltd., Chembur, Bombay-400074, Ind.

[21] Appl. No.: 331,817

[22] Filed: Oct. 31, 1994

[51] Int. Cl.$^6$ .............. H02K 49/00; H02P 15/00
[52] U.S. Cl. .............. 310/103; 310/104; 310/105
[58] Field of Search .................. 310/103, 104, 310/105, 108, 109, 78

[56] References Cited

U.S. PATENT DOCUMENTS

| | | | |
|---|---|---|---|
| 1,246,643 | 11/1917 | Neuland | 310/103 |
| 1,784,309 | 1/1927 | Neuland | 310/103 |
| 2,453,957 | 11/1948 | Allen | 310/108 |
| 3,974,408 | 9/1976 | Fehr et al. | 310/103 |
| 4,115,040 | 9/1978 | Knorr | 417/420 |
| 4,117,357 | 9/1978 | Baumann | 310/52 |
| 4,387,335 | 6/1983 | Fisher et al. | 322/32 |
| 4,808,869 | 2/1989 | Kopp | 310/78 |
| 4,857,785 | 8/1989 | McCarty | 310/78 |
| 5,001,412 | 3/1991 | Carter et al. | 322/10 |

*Primary Examiner*—Thomas M. Dougherty
*Assistant Examiner*—Elvin G. Enad

[57] ABSTRACT

A mechanical power transmission assembly which uses an electro-magnetic system with internal electrical feedback to obtain the desired torque speed characteristics at the load shaft is presented. The assembly comprises of two coaxial magnetic rotating parts having an air gap between them with one part capable of rotating over the other at different speeds. One of the rotors is connected to the driving engine and the other rotor to the load shaft. The magnetic parts house electrical windings which are connected to each other through means such as commutators or slip rings and brushes allowing direct or alternating currents, as desired, to circulate in the windings and with means for controlling the currents in them. The assembly system is capable of being used for a variety of purposes besides mechanical power transmission, such as for staffing the engine and supplying electrical power.

2 Claims, 1 Drawing Sheet

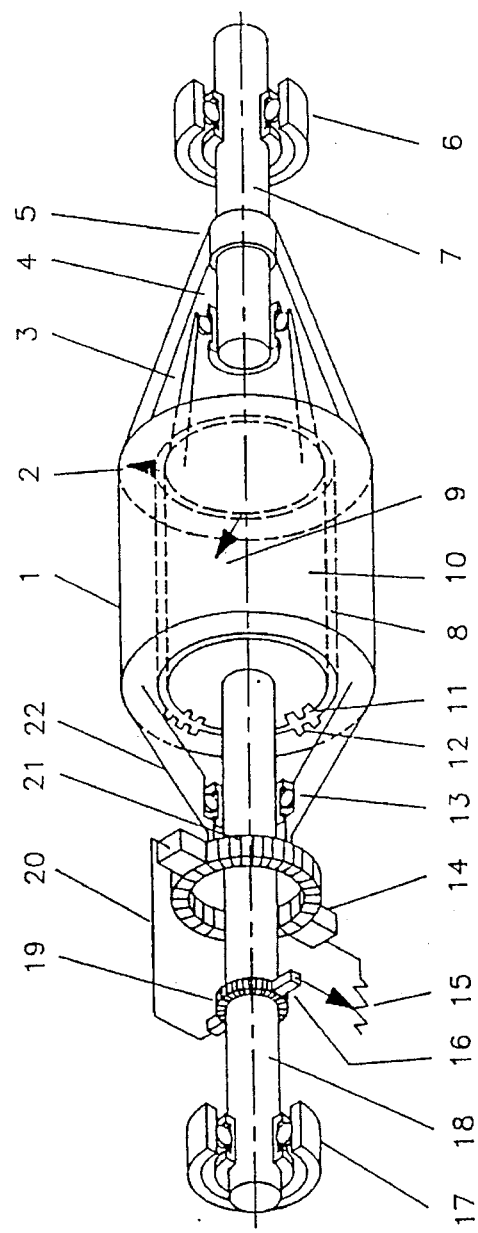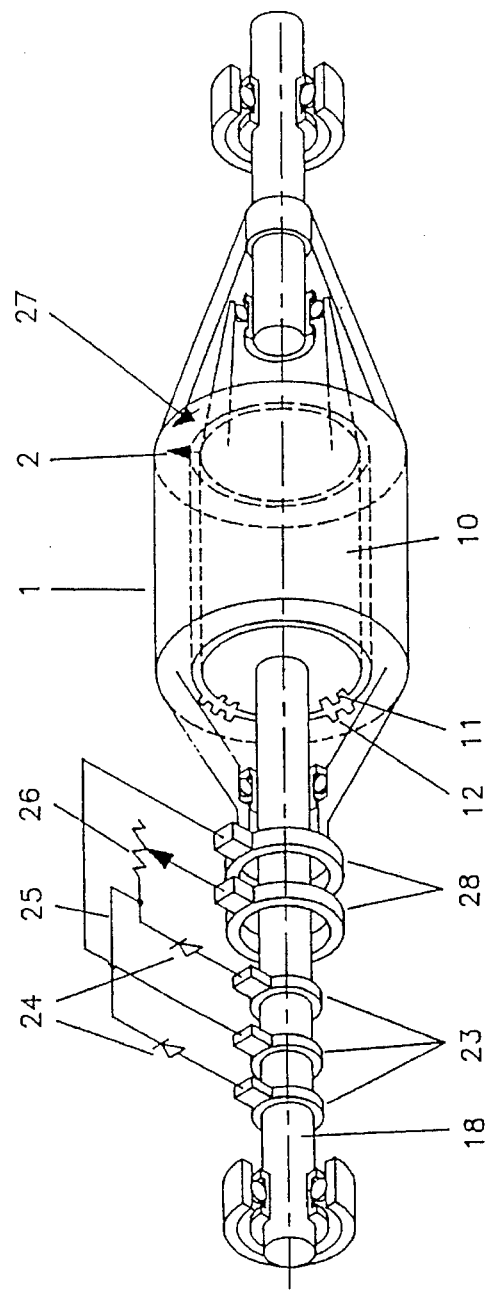

MECHANICAL POWER TRANSMISSION ASSEMBLY

This invention relates to transmission of mechanical power using an electromagnetic device particularly for continuous and smooth variable speed drives under manual or automatic control.

It has always been the desire to have smooth variable rotational speed transmission of mechanical power over large speed ranges. It is known in the art that reasonable variable speed transmission for low powers is possible through mechanical friction aided devices by changing friction contacts at varying radii, but at high powers, efficient transmission through variable gear ratio changes has been the preferred method. Where the transmission from an engine is to be all mechanical, the requirement of high torque at low speeds Is generally obtained, in the art, by running the engine at high speeds and reducing the speed at the load point by gears. At high speeds of the load shaft the gear ratio is changed, such as in cars, to keep the engine at the right speeds for delivering the maintenance torques at the load point. Because of the involvement of gear changes through the complete speed range there are as many interruptions in the transmission as there are gear changes.

On the other hand, as is also known in the art, smooth rotational speed changes through the full range is easily possible with good efficiency, in electrical transmission once the initial mechanical power is converted to electrical power through a electric generator. It is quite frequently used in railway traction where electrical power is picked up either directly from external conductors or generated with prime movers on the traction engine. In the former case there is only one electrical device for traction on the locomotive, namely the motor and in the latter case there are two electrical devices, the generator and the motor. Also known is that direct current series motor is the favoured traction device because of its ideal torque speed characteristics. At low speeds high torques are required for acceleration and at high speeds only low maintenance torques are needed to keep the desired speeds which the direct current series motor adequately provides.

An object of the present invention is to perform the transmission of mechanical power in a single device through electric power generation and drive with smooth and continuous speed changes and with the desired torque speed characteristics, with manual or automatic control of speeds. A feature of this invention is two coaxial rotatable coupled magnetic systems having embedded electrical windings as in electrical machines, known in the art, but with the difference that each of the said coaxial parts is mechanically coupled one to the prime mover and the other to the shaft driving the load so that both the said coaxial parts rotate and transmit mechanical power. Another feature is feedback between the two said rotating parts by picking up the currents from the said windings, as an illustration, with brushes and commutators or slip rings and electrically coupling the said windings through control circuits. Yet another feature of the invention is mechanical transmission with desired speed torque characteristics with the possibility of simultaneously meeting electrical power requirements by tapping off electrical power from the said winding circuits.

The above and other features of the invention will now be more particularly described with reference to the accompanying drawings and pointed out in the claims. It will be understood that the particular assemblies and the explanations are by way of illustrations only and not as limitations of the invention. The principles and features of the invention may be employed in various and numerous embodiments without departing from the scope of the invention.

Reference is made to the accompanying drawings in which are shown illustrative embodiments of the invention from which its novel features and advantages will be apparent.

In the drawings:

FIG. 1 is an exploded perspective view of one form of the transmission assembly illustrative of an embodiment of the invention.

FIG. 2 is an exploded perspective view of another form of the transmission assembly illustrative of an embodiment of the invention with slip ring assemblies and rectifiers circuits represented in schematic form, all of which form parts of the assembly.

Description of the illustrative Embodiments

Referring to FIG. 1:

There are two coaxial magnetically coupled rotable parts, 1 and 10, housing electrical windings, in slots like, 11 and 12, round the peripheries. One of the rotatable parts, 1, is mechanically connected to the driver engine through the support, 5, and the shaft, 7, and the other rotatable housing, 10, is mechanically coupled to the shaft, 18, driving the load. Hereinafter, 1, will be referred to as the outer rotor and 10, as the inner rotor. The mechanical connections can be reversed according to convenience, with the engine connected to shaft, 18, and the load to shaft, 7. To describe the device the case of direct current on the two rotor windings housed in slots indicated by, 11 and 12, is considered. The windings terminate on to two commutators, 21 for the outer rotor and 19 for the inner rotor. The commutator, 21, rotates along with the outer rotor, 1, through support, 22. The commutator, 19, mounted on shaft, 18, rotates along with the inner rotor, 10. Brush pairs, 14, on the commutator, 21, and 16 on commutator, 19, are placed at right angles to each other in the magnetic pole space and are held on stationary supports. The illustration herein considers the case of two magnetic poles though multiple magnetic pole configuration with multiple brushes is usable. The brushes are connected in series, through connection, 20, and through control variable resistor, 15. The outer rotor, 1, is supported by bearing, 6, on stationary supports and bearing, 13, on the rotating shaft, 18. Bearing, 17, for the shaft, 18, has stationary supports and the other side of the inner rotor, 10, has bearing, 4, on support, 3, and on shaft, 7.

The features of the drive are explained as follows: As the engine begins driving one rotor any remnant magnetic field existing in the air gap, 8, between the rotors will induce emf in the windings. Current begins flowing in both the rotor windings as the engine rotates. Two steady magnetic fields, indicated schematically by 2 and 9, are established in the rotor gap, 8, by the combinations of the windings, commutators and brushes on the two rotors. As the current begins to flow the magnetic field in the air space, 8, between the rotors is enhanced thereby increasing the generated emf which causes the current to rise further. The cummulative effect will continue till non-linearities or controls, 15, in the winding circuits bring about a steady state. The magnetic field, 2, indicated schematically, created by the current in the windings on the inner rotor, 10, is perpendicular to the brush pair, 16, on the inner rotor commutator, 19, and the other magnetic field, 9, shown schematically, created by the current in the windings on the outer rotor, 1, is likewise perpendicular to the brush pair, 14, on the outer rotor commutator, 21. Since the brash pairs, 14 and 16, are perpendicular to each other, the air gap magnetic fields, 2 and 9, are also perpendicular to each other. A torque is established on the inner rotor, 10, causing it to follow the rotor, 1, which is being driven by the engine.

If no remnant field exists at the start, according to the invention, the series connection, 20, between the windings is broken temporarily and a small direct current is injected in the circuit from a direct current source such as a battery. The source is removed and fie circuit simultaneously reclosed before the injected current decays. The winding inductances would keep the current alive for a period. This current will provide the staffing magnetic field in the air gap, 8, after which the sequences for the growth and maintenance of the field and the rotation of the inner rotor, as already referred to, will follow. Other methods of creating the initial field as with special windings on one of the rotors and passing current through it or with withdrawable permanent magnets are other features of the invention.

The transmission assembly could also be used to initially start the engine by gripping the load shaft to prevent its rotation, feeding currents to the two windings from a battery to make only the engine shaft rotate, then breaking the winding circuit once the engine starts and remaking the circuit to the configuration required for mechanical power transmission. This is yet another feature of the invention. Where brakes are provided the brake system could be used for gripping the load shaft.

To explain the feature of the torque speed characteristic let it be assumed that the engine speed is kept constant by feedback after sensing the speed with a sensor. If the load torque on the rotor, 10, increases the rotor will tend to slow down. The slip between the two rotors, 1 and 10, increases. A larger emf is induced on the windings in the rotors, a larger current flows in both the windings, larger magnetic field in the air gap, 8, is created and the rotating torque is increased, which caters to the higher torque requirement of the load shaft, 18. Simultaneously, the fuel input to the engine increases automatically to keep its speed constant and at the same time provide the increased torque demand. The torque speed characteristics of the embodiment will be almost like that of the direct current series motor. Even If the engine is not kept at a constant speed, its speed will have to be adjusted by higher fuel injection or by allowing a slow down in engine speed without permitting the stall regions of the torque speed characteristics to be reached. The speeds of the load shaft will adjust accordingly in order to meet the torque requirements.

The current is controllable by the variable series resistor, 15, to adjust the magnetic field strength to set the desired speed, generally, of the load shaft, 18, at the required torque, which is another feature of the invention. In order to improve the efficiency instead of control by the series resistor, 15, electronic control such as through thyristor systems is also usable.

The illustration has used the series motor analogy but it is possible to use the shunt field system or series and shunt combinations to get the desired characteristics. Brushless commutation designed through standard methods, known in the art, using electronic components is feasible.

According to the invention, slip rings instead of commutators are usable and the rotor currents can be alternating current or a combination of alternating current and direct current. As an illustration by way of FIG. 2, the windings in slots indicated by, 12, on the rotor connected to the engine is fed direct current through the two slip rings, 28, and rectifying circuit, 25. The alternating current from the windings in slots indicated by, 11, on the inner rotor, 10, picked up through the three slip rings, 23 is rectified by rectifiers, 24. In order to avoid magnetic saturation in the ferromagnetic circuits when alternating current is rectified, full wave rectification or multiphase tapping and rectification is utilised. The three slip rings, 23, are provided for full wave rectification. The magnetic field, 2, caused by the direct current in the winding of rotor, 1, rotates as indicated by 27, along with this rotor driven by the engine. The rotating field, 2, and the induced alternating current in the windings of the rotor, 10, connected to the load shaft, 18, generate the torque almost similar to that in induction motors, known in the art. The speed, generally, of the load shaft, and the torque speed characteristic is suited to the condition under which the device is used, through controls, schematically shown by, 26.

I claim:

1. Mechanical power transmission assembly having coaxial rotatable inner and outer parts of magnetic material, each independantly rotatable, with air gap space between the rotatable parts, one part connected to a driving engine and the other to a load to be driven at variable speed, each of the rotatable parts provided with electrical windings and means for commutation for obtaining direct current from current generated in the windings, with means for controlling the direct current and feeding back into the windings of the other rotatable part, with the means for commutation of one rotatable part placed with substantial angular displacement from the means for commutation of the other rotatable part, to enable magnetic force element in the air gap space between the two rotatable parts due to the current in the windings, to have substantial angular displacement from magnetic force element in the same air gap space from the other rotatable part to generate torque, which enables effective transmission of power from the engine to the load at variable speeds of both the engine and the load.

2. Mechanical power transmission assembly having coaxial rotatable inner and outer parts of magnetic material, each independantly rotatable, with air gap space between the rotatable parts, one part connected to a driving engine and the other to a load to be driven at variable speed, each of the rotatable parts provided with electrical windings, means for tapping generated alternating current from one rotatable part, with means for controlling the current and means for conversion to direct current, with means for feeding the converted direct current into the windings of the other rotatable part, to produce rotating magnetic force element in the air gap space between the rotatable parts, to generate torque from interaction with the alternating current in the windings, to enable effective transmission of power from the engine to the load at variable speeds of both the engine and the load.

\* \* \* \* \*